United States Patent [19]

Abrahamson

[11] Patent Number: 4,507,644
[45] Date of Patent: Mar. 26, 1985

[54] TOUCH RESPONSIVE SECURITY AND ANTITHEFT SYSTEM

[75] Inventor: John C. Abrahamson, Salt Lake City, Utah

[73] Assignee: Custom Touch Electronics, Salt Lake City, Utah

[21] Appl. No.: 474,816

[22] Filed: Mar. 10, 1983

[51] Int. Cl.³ .............................................. B60R 25/04
[52] U.S. Cl. ...................................... 340/64; 340/63; 307/10 AT; 200/42 R; 180/272; 180/287; 116/33
[58] Field of Search ................. 340/64, 63, 52 R, 541, 340/542, 543, 573, 576, 590, 687; 180/272, 287; 307/10 AT; 116/33; 200/1, 2, 42 R; 290/34, 35, DIG. 1

[56] References Cited

U.S. PATENT DOCUMENTS

| | | | |
|---|---|---|---|
| 4,157,478 | 6/1979 | Quinton | 340/64 |
| 4,274,086 | 6/1981 | Benckendorff et al. | 307/10 AT |
| 4,371,052 | 2/1983 | Brandt | 307/10 AT |

*Primary Examiner*—Donnie L. Crosland
*Attorney, Agent, or Firm*—B. Deon Criddle

[57] ABSTRACT

A method and apparatus for preventing theft or unauthorized use of an article such as a motor vehicle. The apparatus includes an exposed electrically conductive element, at least one exposed electrically conductive touch pole and a control mechanism which prevents normal operation of the article unless electrical communication has been established between the exposed conductive element and the touch pole. In a preferred embodiment of the invention for preventing theft or unauthorized use of a motor vehicle, the conductive element and at least one touch pole are provided within the passenger compartment of the motor vehicle, and to properly activate the ignition system of the motor vehicle to an operable state the operator must touch the conductive element and while maintaining contact with the conductive element, then touch the touch pole or each of the touch poles if a plurality of such touch poles are provided. The control mechanism disables the ignition of the motor vehicle until it has sensed that electrical communication has been made between the conductive element and each of the touch poles, whereupon the ignition system is activated to an operable state.

20 Claims, 4 Drawing Figures

TOUCH RESPONSIVE SECURITY AND ANTITHEFT SYSTEM

BACKGROUND OF THE INVENTION

1. Field

The present invention relates generally to apparatus and methods for preventing theft or unauthorized use of an article. In one particularly preferred embodiment, the invention pertains to apparatus and methods for preventing theft or unauthorized use of motor vehicles by disabling the electrical ignition and starting systems of such motor vehicles.

2. State of the Art

Numerous systems and methods have been proposed to disable an engine of a motor vehicle and/or to produce an audible alarm to prevent unauthorized use of the motor vehicle. Many such systems include electrical, mechanical or a combination of electrical and mechanical devices in which a preset coded input to the system is required by person attempting to use the vehicle. Many variations have been proposed for the preset coded systems as shown in U.S. Pat. Nos. 2,650,989; 3,618,009; 3,619,633; 3,818,436; 3,973,641; 4,151,509; and 4,180,043. Other systems which have been proposed utilize hidden switches which disable the ignition of the automobile. The latter systems are exemplified by U.S. Pat. Nos. 4,063,610; 4,297,674; and 4,302,747.

Although many systems have been proposed as indicated above, few if any have been utilized commercially because of various reasons. Many of the proposed systems were generally ineffective for a variety of reasons. Primarily, the systems could be easily circumvented or disabled by the thief or other unauthorized user of the automobile. Further, the systems proposed heretobefore generally incorporated somewhat expensive, complex and numerous components. The systems in many cases were large, cumbersome, or otherwise difficult to install and repair. As a result of the many inherent problems, the systems of the prior art were not used at least on any wide commercial basis.

3. Objectives

The development of a generally inexpensive, reliable, security or antitheft mechanism, device or system would be advantageous, and the principal objective of the present invention is to provide such an improved security or antitheft mechanism, device and system which is relatively simple and avoids the pitfalls encountered by the prior art devices and methods. A particular objective is to provide a security or antitheft device and system which utilizes exposed touch poles rather than switches, dials and push buttons with the touch poles being selected from ordinary fixtures or items normally found on the apparatus or automobile to which the security system is associated, such that there is no indication of the presence of the security system. A further objective of the invention is to provide a security system which automatically reactivates and resets itself when authorized use of the apparatus has been terminated. An even further objective of the invention is to provide such an automatic security system which further activates lights or a horn of the apparatus with which the security system is associated whenever an attempt is made to use the apparatus without first properly activating the security system. An additional objective of the present invention is to provide an automatic security system which prevents unauthorized use of the apparatus with which the security system is associated while also protecting the apparatus from being tampered with or otherwise vandalized.

SUMMARY OF THE INVENTION

The above objectives are achieved in accordance with the present invention by a unique, simple, relatively inexpensive security system which is adapted to render inoperative the apparatus with which the system is associated until the security system is properly activated. The system of the present invention comprises an exposed electrically conductive element and at least one exposed electrically conductive touch pole. The electrically conductive element and the touch pole are selected from ordinary fixtures or items normally found on the apparatus to which the security system is associated. For example, when the security system is incorporated on an automobile, the electrically conductive element and the touch pole are advantageously selected from the plurality of screws or other metallic fasteners which are used in assembling the dashboard or other features in the passenger compartment of the automobile. The components which are proper candidates to be used as the electrically conductive element and the touch pole or touch poles should, in accordance with a particularly preferred embodiment of the present invention, be insulated from ground, i.e., the components should not make contact with other grounded electrically conductive elements of the automobile. It is not difficult to select proper elements for the electrically conductive element and the touch pole or poles from the numerous metallic fasteners used in the passenger compartment of an automobile and which are not in contact with other grounded electrically conductive elements of the automobile.

The security system of the present invention further comprises a control mechanism which prevents normal operation of the apparatus with which the security system is associated unless electrical communication has been established between the electrically conductive element and the touch pole or touch poles if a plurality of touch poles are utilized. In the embodiment of the invention as used to prevent unauthorized use of theft of an automobile, the control mechanism comprises circuitry including a relay switch which is adapted to inactivate the ignition system of the automobile whenever the ignition key is turned off. The ignition system is thereafter maintained in its inactive, inoperable state by the relay switch until electrical communication is established between the electrically conductive element and the touch pole or poles. The security system, thus, automatically rearms itself every time the ignition key is turned off and prevents subsequent unauthorized operation of the automobile.

When the electrically conductive element and the touch pole or poles are selected from a group of numerous, natural and ordinary fixtures or items in the passenger compartment of the automobile, it becomes essentially impossible, or at least impractical, for an unauthorized person, thief or intruder to discover the correct fixtures or items within a reasonable time period either by chance or otherwise. There are no switches or obvious items for the unauthorized person, thief or intruder to search for, and the wiring of the security system is readily incorporated into the maze of wires currently incorporated in the automobile so that it is practically impossible for the unauthorized user, thief or intruder to trace the wiring so as to defeat the system.

The control mechanism or circuitry of the present invention may also include means for sounding the horn of the automobile when any unauthorized use of the automobile is attempted. The means for sounding the horn comprises a second relay switch which is included in the control mechanism. The second relay switch is adapted to automatically connect the horn to the starter switch whenever the security system is in its inactivated state. If the starter switch is turned on while the security system is in its inactivated state, the horn blows and the starter motor remains dead. Upon proper activation of the security system, the second relay switch disconnects the horn from the starter switch and connects the starter switch with the starter motor, whereupon the starter motor then operates in normal fashion when the starter switch is turned on.

The control mechanism or circuitry of the present invention may further include means for controlling other auxiliary equipment which can be adapted to further stymie attempts at unauthorized use or theft of the automobile or to prevent vandalism and misuse of other components of the automobile. The means for controlling the auxiliary equipment includes relay switches included in the control mechanism or circuitry in addition to and separate from the relay switches used to operate the ignition and starter systems. The relay switches may be used to control solenoid operated fuel line valves, whereby the fuel line valve is maintained closed when the security system is in its inactivated state. When the security system is activated, the fuel line valve is opened to allow use of the vehicle. Such a system is useful with diesel engines which do not have an ignition system. The braking system of large diesel rigs can also be controlled with one of the separate relay switches provided in the control mechanism or circuitry of the security system. The brake activating relay switch is adapted to control a solenoid operated valve on the brake system of the rig so that the brakes would be set at all times when the security system is in its inactivated or armed state. When the security system is properly activated, the relay switch of the control mechanism would then activate the solenoid valve on the brake system of the truck so as to release the brakes for normal operation.

Another auxiliary item which can advantageously be controlled by the security system of the present invention is the locking and unlocking of doors on the vehicle. For use on large truck rigs, the cargo doors of the rig can be provided with solenoid operated locks, with the locks being maintained in the locked state whenever the security system is in its inactivated or armed state. The driver of the rig or any other authorized person could unlock the cargo doors by properly activating the security system. A timing device could be associated with the solenoid operated door locks to return them automatically to their locked state following a preset time delay. This would allow the driver or the authorized person to open the doors during the preset time delivery, but the doors would automatically relock following the preset time delay.

Additional objects and features of the invention will become apparent from the following detailed description taken together with the accompanying drawings.

THE DRAWINGS

Preferred embodiments of the invention representing the best mode presently contemplated of carrying out the invention are illustrated in the accompanying drawings, in which.

DETAILED DESCRIPTION OF THE ILLUSTRATED EMBODIMENTS

The present invention provides a unique, novel method, apparatus and system for preventing theft or unauthorized use of an article or apparatus with which security system is associated. As will be apparent from the brief description given above and the detailed description of a particularly preferred use of the security system as follows hereinbelow, the security system of the present invention can be used to protect various articles or apparatus. A particularly preferred use of the security system is to prevent the theft or unauthorized use of a motor vehicle. In the following detailed description, the security system will be described in combination with an internal combustion automobile which utilizes an electrical ignition system comprising a source of electrical potential, such as a battery, a coil, distributor and a set of spark plugs. However, it will be completely apparent and should be realized that the security system could be used on a motor vehicle of the diesel type or, for that matter, on any piece of apparatus for which the operation can be controlled electrically as by switches, solenoid operated valves etc.

The security system of the present invention provides an exposed electrically conductive element and at least one exposed electrically conductive touch pole which are selected from a group of elements normally included on the apparatus to which the security system is to be associated. The electrically conductive element and the touch poles are used to activate the control mechanism which permits authorized use of the device or apparatus. By selecting the electrically conductive element and the touch poles from a group of elements normally occurring on the device or apparatus, there is no indication to a thief or unauthorized user that the apparatus has a security system associated therewith. The elements are completely innocuous and give no indication that manipulation thereof is necessary to operate the apparatus. Additionally, of course, the elements do not give any indication of which ones thereof must be manipulated or in what order. Even after the thief or unauthorized user attempts to operate the apparatus and discovers that the apparatus is inoperable, there are no switches, wiring, etc. which can be readily traced to defeat the security system. The thief or unauthorized user will almost universally find that it is too much trouble to continue his attempt to operate the equipment or apparatus and leave before he is otherwise caught.

Figure 1:
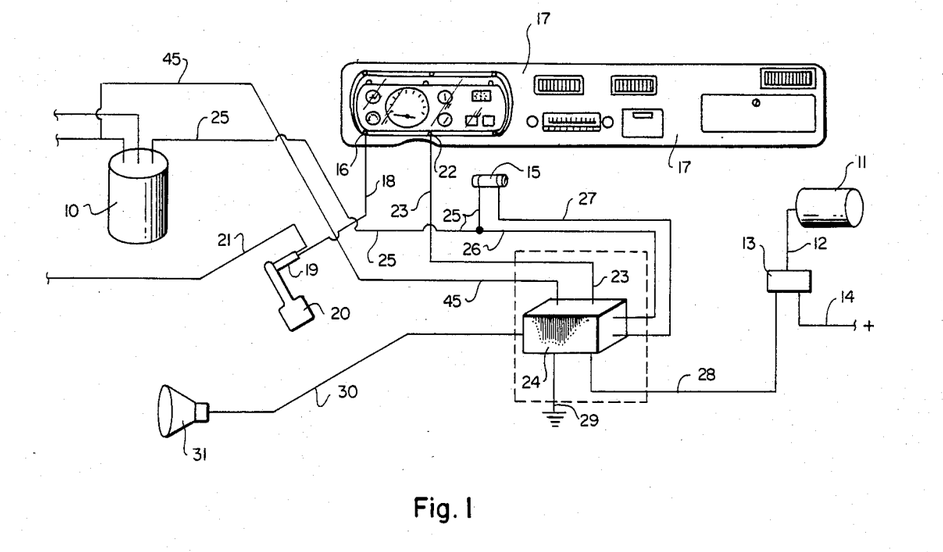
FIG. 1 is a pictorial schematic of a preferred embodiment of the security system of the present invention as it is used in combination with the ignition system of an automobile.

The security system is ideally suited to preventing theft and unauthorized use of motor vehicles. A preferred embodiment of the security system utilized in combination with a motor vehicle will be described with reference to the accompanying drawings. As illustrated in FIG. 1, the motor vehicle is of the type having an ignition coil 10 and an electrical starting motor 11. The coil 10 is connected as is customary and well known to a distributor which is not shown in the drawings. The operation of the coil and distributor are well known and will not be discussed in detail herein. The motor vehicle customarily has an electrical energy supply means, such as the battery which is not shown in the drawings. Generally, the starting motor 11 is connected to the energy supply means by a cable 12, a starter solenoid 13, and another cable 14 which is connected between the starter solenoid 13 and a source of positive electrical potential on the energy supply means.

An ignition and starter switch 15 is customarily provided on a motor vehicle, with the switch 15 being of the key operated lockable type. The switch 15 is customarily found in the steering column or the dashboard of the automobile, but is shown isolated for purposes of illustration in FIG. 1. The switch 15 is of the type that when a key is inserted thereinto and turned, the ignition switch component thereof is closed and upon further turning, the starter switch component thereof is closed to energize the starter solenoid 13 and, thus, the starter 11. After the motor has been started, the key is released, and the switch 15 is adapted to turn back automatically so as to disconnect or open the starter switch component thereof while still maintaining the ignition switch component in a closed position. Operation of the motor vehicle is customarily terminated by turning the key in the switch 15 so as to disconnect or open the ignition switch component thereof, and then withdrawing the key from the switch 15. Hereinafter, the individual switch components of the multiple switch unit may be referred to as ignition switch 15 or starter switch 15.

In accordance with the present invention, the security system or antitheft mechanism or device comprises an exposed electrically conductive element. This element can be any exposed electrically conductive item in reach of the driver's seat in the passenger compartment of the motor vehicle. The exposed electrically conductive element must, in the system shown in the drawings and described herein, be insulated from ground inasmuch as means are provided for connecting a source of positive electrical potential to the electrically conductive element and if the electrically conductive element was not insulated from ground, a direct short to ground would result. In modern automobiles, the dashboard and many other components in the passenger compartment are made of plastic materials which are electrical insulators. Numerous metallic fastening elements, such as screws, are used in assembling the plastic components, and the metallic fastening elements are, thus, insulated. Any of such fastening elements or other insulated electrically conductive members can be used as the electrically conductive element.

As illustrated in FIG. 1, a screw 16 in the dashboard 17 is used as the electrically conductive element. The means for connecting the screw 16, i.e., the electrically conductive element, to a source of positive electrical potential from the electrical energy supply means includes a wire 18 which is attached at the back of the dashboard 17 in electrical communication with the screw 16. Conventional electrical wire such as used in wiring of the automobile is used and the connection behind the dashboard 17 is made so that the connection appears to be simply one of numerous wires which are connected with other electrical components in the dashboard 17. In the preferred embodiment of the security system as illustrated, the other end of the wire 18 is attached to a switch which when activated or closed will provide a source of positive electrical potential to the wire 18. Many switches can be used such as the radio on-off switch, the air conditioning on-off switch and a light switch which turns the passenger compartment lights on. In an advantageous embodiment shown in FIG. 1, the other end of the wire is attached to the brake pedal switch 19 which turns on the brake lights when the brake pedal 20 is depressed. When the brake pedal is depressed, the brake pedal switch 19 energizes the brake lights through wire 21 and at the same time energizes the wire 18 which runs to the electrical conductive element, i.e., the screw 16.

At least one touch pole is provided which is electrically conductive and is exposed for touching. As with the electrically conductive element, the touch pole or poles can be any exposed electrically conductive item in reach of the driver's seat in the passenger compartment of the motor vehicle. The touch pole or poles must also be insulated from ground. For simplicity only one touch pole is shown in FIG. 1 and that touch pole comprises another screw 22 in the dashboard 17. A wire 23 is inconspicuously connected to the screw 22 through the back of the dashboard 17, and the other end of the wire is connected to a control circuit which is housed in a control box 24. The control box 24 is hidden anywhere out of sight in the automobile. The control box 24 can be mounted under the hood of the engine compartment, in the wheel wells of the automobile, in the trunk, or hidden in the passenger compartment. The wire 23 is again conventional electrical wire such as used in wiring of the automobile, and the connection behind the dashboard 17 is made so that the connection appears to be simply one of the numerous wires which are connected in components in the dashboard 17.

The control circuit located within the control box 24 is interposed in the ignition circuit and starting circuit of the automobile and is adapted to monitor the touch pole or poles, i.e., the screw 22 or multiple screws like screw 22 which are electrically connected to the control circuit. The control circuit is interposed in the ignition circuit by connecting wire 26 from the control circuit within the control box 24 to the ignition wire 25 which runs from the ignition switch 15 to the coil 10. The wire 26 from the control box is joined to or connected to the ignition wire 25 at an inconspicuous point along the length of the ignition wire, such that it is impossible or at least impractical for a thief or unauthorized user to trace the ignition wire 25 to discover the wire 26 from the control box. The control circuit within the control box 24 is interposed in the starting circuit by cutting the wire 27 from the starting switch 15. The portion of the starter wire 27 from the starter switch 15 is connected to the control box 24, and the portion 28 of the starter wire which comes from the starter solenoid 13 is also connected to the control box 24. As illustrated in FIG. 1, the control box 24 has two additional wires extending therefrom. One of the wires is a ground wire 29 which leads from the control box to ground. The other wire is a horn wire 30 which is used as will be described hereinafter to sound the horn of the automobile when a thief or an unauthorized user attempts to start the motor of the automobile without first activating the security system of this invention.

The control circuit is adapted to inactivate the ignition circuit of the motor vehicle and thus disable the motor vehicle by shorting the ignition coil to ground which effectively disables the ignition coil. The control circuit as will be more fully described hereinafter shorts the ignition coil to ground automatically whenever the ignition switch is turned to its off or open position. The control circuit is adapted to thereafter monitor the touch pole or touch poles and to reactivate the ignition circuit by breaking the short to ground from the ignition coil so as to render the ignition coil 10 and ignition system of the motor vehicle operable when and only when (1) electrical communication is established between the electrically conductive element, i.e., the screw 16, and the touch pole, i.e., screw 22, and (2) an electrical potential has simultaneously been applied to the screw 16 by depressing the brake pedal 20 to close the brake pedal pedal switch 19. Thus, by turning off the ignition switch 15, the ignition circuit and the motor vehicle are rendered inoperable. The motor vehicle remains in an inoperable state until the brake pedal 20 is depressed and electrical communication is simultaneously established between the screws 16 and 22, i.e., between the electrically conductive element and the touch pole. Thus, to use the motor vehicle, an authorized user or operator will first depress the brake pedal 20 and then simultaneously touch the screws 16 and 22 with his hands. The authorized operator thus acts as the electrically conductive lead which puts the screws 16 and 22 in electrical communication. When the operator touches screw 16 with one part of his body and screw 22 with another part of his body, such as with his hands, electrical communication is established through the body of the operator between the electrically conductive element and the touch pole, i.e., between the screws 16 and 22, and the control circuit is adapted to monitor the touch pole (screw 22) and sense when the electrical communication is made between the touch pole (screw 22) and the electrically conductive element (screw 16).

The security system of the present invention is also advantageously adapted to control the starter system of the motor vehicle. Customarily, the starter system includes a starter switch which is part of the ignition and starter switch means 15. The control circuit of the security system is adapted to permit operation of the starter system only after the security system has been properly activated in the manner as explained above. The control circuit is adapted to interrupt electrical communication between the starter switch and the starter solenoid whenever the ignition circuit is inactivated by the control circuit, i.e., when the control circuit is in its inactivated state. When the control circuit has been properly activated, electrical communication is established between the starter switch 15 and the starter solenoid 13, whereby the starter motor 11 can be operated in normal fashion. As more fully explained hereinbelow, the security system is advantageously adapted to sound the horn 31 whenever the starter switch 15 is turned to its on or closed position and the control circuit has not been properly activated. The unexplained sounding of the horn presents a frustration to the potential thief, and the thief will generally make a hasty exit to avoid discovery.

Figure 2:
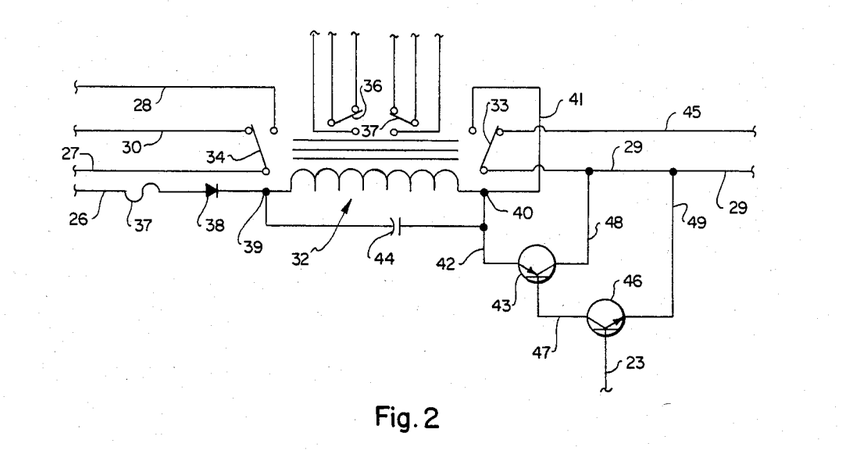
FIG. 2 is an electrical schematic of the electrical control mechanism contained within the dashed lines of FIG. 1.

One preferred embodiment of the circuitry contained within the control circuit or in the control box 24 of FIG. 1 is shown in FIG. 2. The circuitry is simple, inexpensive and reliable. A relay switch 32 is provided which contains at least two single pole, double throw switches. As illustrated, four single pole, double throw switches 33 through 36 are provided. The ignition wire 25 from the ignition switch is connected in series with a fuse 37, a diode 38 and one end 39 of the winding of the relay switch 32. The fuse 37 protects the control circuit from any possible overcurrent and the diode 38 prevents reverse current flow through the winding of the relay switch 32. The other end 40 of the winding of the relay switch 32 has two connections thereto. One connection, through conductor 41, is to the normally open terminal of the single pole, double throw switch 33, and the other connection, through conductor 42, is to the emitter of a p-n-p transistor 43. A capacitor 44 is connected between the one end 39 of the winding of the relay switch 32 and the conductor 42 so as to shunt the winding. The capacitor provides a short lived voltage source to maintain current through the coil of the relay switch 32 even if the switch 15 may be worn and have a momentary dead spot in it as it is moved between the starting position and the normal run position. If such a dead spot exists in the switch 15, then, in the absence of the capacitor 44, the ignition system would be incapacitated as the starting switch is returned to the normal run position. The capacitor 44 provides sufficient voltage to maintain the current through the coil of the relay switch and thus avoids any inadvertent inactivation of the security system due to a worn starter ignition switch 15.

The common terminal of the switch 33 is connected, through the ground wire 29, to ground. The normally closed terminal of switch 33 is connected, through wire 45, to the ignition coil 10. Thus, it can be seen that when the switch 33 is in its normal position, i.e., when no current flows through the winding of the relay switch 32, the coil 10 is connected directly to ground through wire 45, switch 33 and wire 29. Of course, when the coil 10 is grounded, the ignition system of the motor vehicle is incapacitated and the motor of the motor vehicle cannot be started. As can further be seen, when current flows through the winding of the relay switch 32, the switch 33 is thrown so that the common terminal of switch 33 makes contact with the normally open terminal thereof. This isolates wire 45, and the coil 10 is no longer grounded. With the coil 10 no longer being grounded, the ignition system is operable, and the motor of the motor vehicle can be started.

Current flow through the winding of the relay switch 32 is initiated by a switching means comprising the transistor 43 and a second transistor 46. The base of the transistor 43 is connected through conductor 47 to the collector of the n-p-n transistor 46. The collector of transistor 43 is connected through conductor 48 to the ground wire 29. The emitter of transistor 46 is connected through conductor 49 to the ground wire 29, and the base of transistor 46 is connected through wire 23 to the touch pole (the screw 22 of FIG. 1). Operation of the motor vehicle to which the security system of the present invention is attached as shown schematically in FIG. 1 is achieved when the proper sequence of steps has been taken to activate the control circuitry by establishing current flow through the winding of the relay switch 32 of FIG. 2. The operator first depresses the brake pedal 20 which provides a positive electrical potential to the exposed electrically conductive element, i.e., screw 16 in FIG. 1, through the wire 18. While still depressing the brake pedal, the operator next touches the exposed electrically conductive element (screw 16) and the touch pole (screw 22 of FIG. 1). The positive electrical potential is communicated through the body of the operator and wire 23 to the base of the transistor 43. This activates the transistor 46 so that current flows from the collector to the emitter thereof, resulting in current flowing through conductor 47, transistor 46, conductor 49 and the ground wire 29 to ground. As current is drawn from the base of transistor 43, the transistor is activated so that current flows from the emitter to the collector thereof, resulting in current flowing through conductor 42, transistor 43, conductor 48 and the ground wire 29 to ground. The current which is thus initiated in conductor 42 by the action of the transistors 43 and 46 is drawn from the winding of the relay coil 32. The flow of current in the winding of relay coil 32 results in switch 33 being thrown to a position in which the common terminal thereof is in contact with conductor 41. Thus, after initial current has caused the switch 33 to activate, current continues to flow through the switch 33, and the relay switch 32 is maintained in its activated state, i.e., with current flowing through the winding thereof, until the ignition switch 15 is turned off. As soon as the ignition switch 15 is turned off, the security system automatically rearms itself, as the switch 33 returns to its normal inactivated state wherein the wire 45 from the coil 10 is in electrical communication with the common terminal of the switch 33. The security system is, thus, automatically reset each time the ignition key is turned off, and subsequent use of the motor vehicle can thereafter be achieved only by proper activation of the security system.

As shown in FIG. 2, the relay switch 32 of the control circuit contains a second single pole, double throw switch 34. Switch 34 is advantageously interposed into the starter system of the motor vehicle such that the starter motor 11 (FIG. 1) can not be turned on until the security system has been properly activated. As was mentioned previously, the wire 27 from the starter switch 15 to the starter solenoid 13 is cut, and the portion 27 of the starter wire from the starter switch 15 is connected to the control box 24 of the security system. As can be seen in FIG. 2, the portion 27 of the starter wire is connected to the common terminal of the switch 34. The other portion 28 of the starter wire, i.e., the portion running to the starter solenoid 13 is connected to the normally open terminal off switch 34. The normally closed terminal of switch 34 is advantageously connected through wire 30 to the horn 31 of the motor vehicle. As can be seen, if the starter switch 15 is turned on without the security system being activated, current will flow through wire 27, switch 34 and wire 30 to the horn 31 so as to sound the horn 31. When the security system has been properly activated the common terminal of the switch 35 makes contact with wire 28, and proper electrical communication is established between the starter switch 15 and the starter solenoid 13 so that the starter motor will operate when the starter switch 15 is turned on.

One or more additional single pole, double throw switches can be provided in the relay switch 32. As shown in FIG. 2, two additional switches 35 and 36 are provided. These switches can be used advantageously to control any auxiliary circuit or apparatus which can be controlled by an on-off type operation. Specifically, the switches 35 and 36 can be used to control the locking of doors on the motor vehicle, or to lock out the brakes or fuel system of the motor vehicle, wherein the doors, brakes and fuel system contain solenoid control valves which can be activated by the switches 35 and 36. Numerous other uses of the auxiliary switches 35 and 36, such as controlling solenoid operated trunk and hood locks, will become apparent to those skilled in the art.

Figure 3:
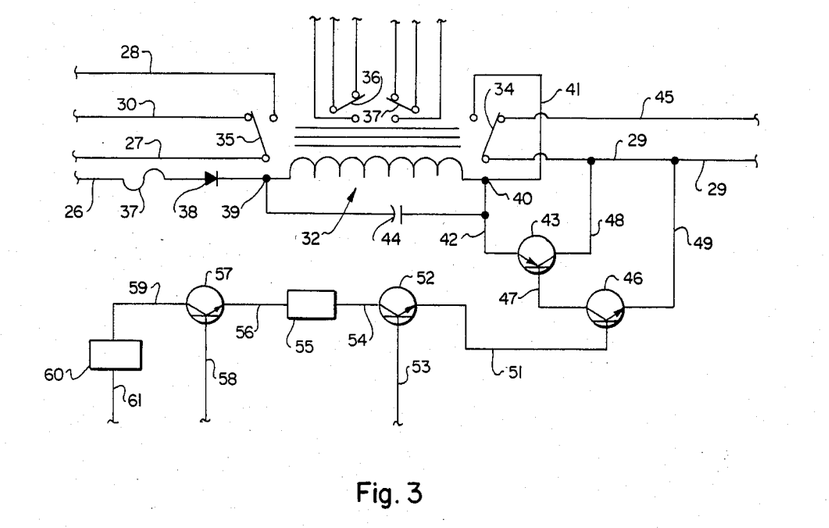
FIG. 3 is an electrical schematic similar to that of FIG. 2 showing an alternative embodiment of the circuitry for the control mechanism.
Figure 4:
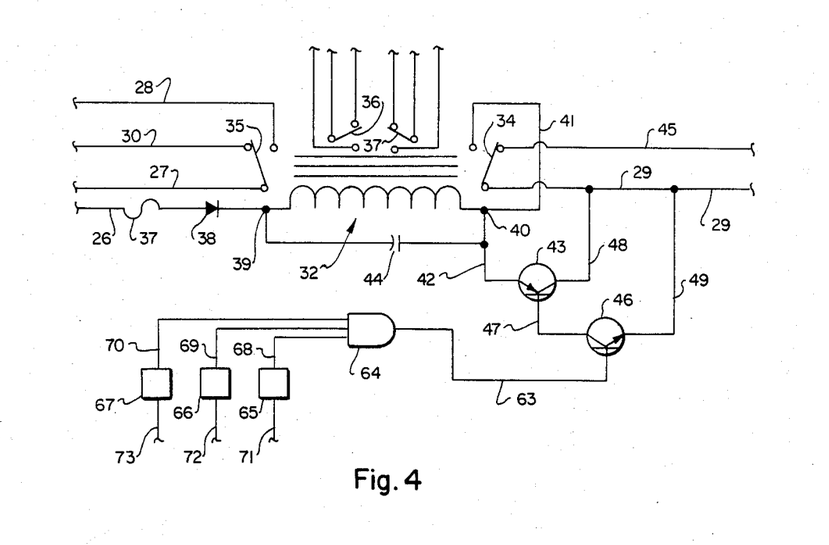
FIG. 4 is an electrical schematic similar to that of FIGS. 2 and 3 showing another alternative embodiment of the circuitry for the control mechanism.

Although the security system shown schematically in FIGS. 1 and 2 utilizes a single touch pole (screw 22 as illustrated) it may be advantageous and is certainly within the scope of the present invention to use two or more touch poles. Schematic diagrams of the control circuitry for systems employing three touch poles are shown in FIGS. 3 and 4. The circuitry of FIGS. 3 and 4 is basically identical to the basic circuitry shown in FIG. 2 with the exception that additional circuitry for evaluating additional touch poles are provided, with the additional circuitry being connected to the base of the transistor 46 of the basic circuitry.

In FIG. 3, the additional circuitry is adapted to monitor three touch poles and to activate the basic circuitry only after the three touch poles have been touched by the operator in a preset sequence and within a given time period. As shown in FIG. 3, the base of the transistor 46 of the basic circuitry is connected through conductor 51 to the emitter of a second n-p-n transistor 52. The base of the transistor 52 is conneced through wire 53 to an appropriate touch pole in the passenger compartment of the motor vehicle. The collector of the transistor 52 is connected through conductor 54 to start-stop multivibrator 55. The multivibrator 55 is connected through conductor 56 to the emitter of a third n-p-n transistor 57. The base of the transistor 57 is connected through wire 58 to an appropriate touch pole in the passenger compartment of the motor vehicle. The collector of the transistor 57 is connected through conductor 59 to a start-stop multivibrator 60. The multivibrator 60 is connected through wire 61 to an appropriate touch pole in the passenger compartment of the motor vehicle.

The touch pole activation system of the multiple touch pole system shown schematically in FIG. 3 is adapted to operate as follows. The electrically conductive element, such as the screw 16 of FIG. 1, is energized, such as by depressing the brake pedal. The operator then touches the energized electrically conductive element, and while still touching the energized conductive element, the operator touches the three touch poles connected to wires 53, 58 and 61 in sequence. The first touch pole which must be touched is the one connected to wire 61. The multivibrator 60 is adapted to present a positive potential to conductor 59 and to sustain the positive potential in conductor 59 for a set time period following the touching of the first touch pole. The second touch pole which must be touched in the sequence is the one connected to wire 58. If the second touch pole is touched within the time period that the multivibrator 60 sustains a positive potential in conductor 59, the transistor 57 is activated to allow a current to pass through the transistor 57, thereby providing a positive potential in conductor 56. The multivibrator 55 is then adapted, upon receiving the positive pulse from conductor 56 to present a positive potential to conductor 54 and to sustain the positive potential in conductor 54 for a set time period following the touching of the second touch pole. The third touch pole which must be touched in the sequence is the one connected to wire 53. If the third touch pole is touched within the time period that the multivibrator 55 sustains a positive potential in conductor 54, the transistor 52 is activated to allow a current to pass through the transistor 52, thereby providing a positive potential in conductor 51. The positive pulse in conductor 51 activates the transistors 46 and 43 in the same manner as described above with respect to the circuitry of FIG. 1 when a single touch pole is used and the pulse from the single touch pole is applied to the base of the transistor 46. In the circuitry of FIG. 3, if the three touch poles are touched in sequence and within a given time period, a positive pulse is applied to the base of transistor 46 through conductor 51. The time periods for the multivibrators 55 and 60 to remain on, i.e., to sustain a positive voltage in conductors 54 and 59, respectively, are readily adjustable over a large range by connecting preselected resistances and capacitances to the multivibrator as is well understood by those skilled in the art.

In FIG. 4, additional circuitry is shown schematically in combination the basic circuitry of FIG. 1, with the additional circuitry being adapted to monitor three touch poles and to activate the basic circuitry only after the three touch poles have been touched in any sequence within a given time period. As shown in FIG. 4, the base of the transistor 46 of the basic circuitry is connected through conductor 63 to an and gate 64. The and gate 64 has three start-stop multivibrators 65, 66 and 67 connected thereby by conductors 68, 69 and 70, respectively. The three multivibrators, in turn, are connected to three touch poles in the passenger compartment of the motor vehicle by wires 71, 72 and 73, respectively. The multivibrators 65, 66 and 67 are each adapted to present and hold a positive potential in their respective conductors 68, 69 and 70 for a set time period after the touch poles associated with the respective multivibrators have been touched. The and gate 64 is adapted to produce a positive potential in conductor 63 when a positive potential is applied simultaneously thereto by the conductors 68, 69 and 70.

The touch pole activation system of the multiple touch pole system shown schematically in FIG. 4 is adapted to activate the basic circuitry whenever the three touch poles have been touched, irrespective of the order of touching, within a preset time period following the touching of the first touch pole. The positive pulse produced in conductor 63 by the and gate 64 activates the transistors 46 and 43 in the same manner as described above with respect to the circuitry of FIG. 1 when a single touch pole is used and the pulse from the single touch pole is applied to the base of the transistor 46. In the circuitry of FIG. 3, when the three touch poles are touched within a preset time period, a positive pulse is applied to the base of transistor 46 through conductor 63. The time periods for the multivibrators 65, 66 and 67 are readily adjustable in the same manner as the multivibrators 55 and 60 as described above with respect to FIG. 3.

Although embodiments of the security system and apparatus of the invention have been illustrated and described, it is to be understood that the present disclosure is made by way of example and that various other embodiments are possible without departing from the subject matter coming within the scope of the following claims. In particular, it is to be noted that the transistors 43 and 46 of control circuitry illustrated in FIG. 2 could be designed to be activated by having a ground or negative voltage impressed thereon by the touch pole connected to wire 23. Thus, a system could readily be designed wherein the electrically conductive element, i.e., the screw 16 in FIG. 1, would be connected to ground rather than to a positive voltage source. The electrically conductive element could then conceivably be any item in the passenger compartment of the motor vehicle which is grounded. Such a ground or negative activation, however, makes it somewhat easier for a thief to possibly subvert the security system. If the thief knows that the security system operates on a ground or negative activation, he could grasp an item which is known to be grounded and then pass his hand over all possible surfaces in the passenger compartment of the vehicle in hopes of accidentally touching the appropriate touch poles. By using a positive voltage to activate the security system, the thief is totally frustrated because he does not know which of numerous possible items in the passenger compartment is the correct electrically conductive element. Thus, the preferred system is as illustrated and described wherein a positive potential is applied to the electrically conductive element.

I claim:

1. A security or antitheft mechanism or device for use with motor vehicles having an electrical energy supply means, an ignition switch, and an ignition circuit including an ignition coil and means for electrically connecting the ignition switch, and the ignition coil in series with the electrical supply means and ground, said security or antitheft mechanism or device comprising:
   an exposed electrically conductive element;
   at least one touch pole which is electrically conductive, is insulated from ground and is exposed for touching; and
   a control circuit which is interposed in the ignition circuit and is adapted to monitor the touch pole, said control circuit also being adapted to inactivate the ignition circuit and thus the motor vehicle by shorting the ignition coil to ground and thus effectively disabling the ignition coil whenever the ignition switch is turned off and to thereafter reactivate the ignition circuit by breaking the short to ground upon establishing electrical communication between said exposed electrically conductive element and said touch pole,
   whereby following the turning off of said ignition switch, the ignition circuit and the motor vehicle are rendered inoperable until the short to ground is broken by touching said electrical conductive element with an electrically conductive lead, and while still touching said exposed electrically conductive element with said electrically conductive lead also touching said touch pole with said electrically conductive lead.

2. A security or antitheft mechanism or device in accordance with claim 1, wherein the operator who is seeking to operate the motor vehicle acts as the electrically conductive lead by touching said electrically conductive element with one part of the operator's body while at the same time touching said touch pole with another portion of the operator's body, whereby electrical connection is established through the body of the operator between the exposed electrically conductive element and the touch pole.

3. A security or antitheft mechanism or device in accordance with claim 1 wherein the motor vehicle also includes a starter motor system and a starter switch in electrical communication between the electrical energy supply means and the starter motor system, and the control circuit is further adapted (1) to interrupt electrical communication between the starter switch and the starter motor system whenever the ignition circuit is inactivated by the control circuit, and (2) establish electrical communication between the starter switch and the starter motor system whenever the ignition circuit is reactivated by the control circuit.

4. A security or antitheft mechanism or device in accordance with claim 3, wherein the motor vehicle also includes a horn, and the control circuit is further adapted to make electrical communication between the starter switch and the horn whenever the ignition circuit is inactivated by the control circuit, such that if an attempt is made to start the motor vehicle while the ignition circuit is maintained in the inactive state by the central circuit, the horn will sound when the starter switch is turned on and the motor vehicle will not operate.

5. A security or antitheft mechanism or device in accordance with claim 1 wherein a plurality of touch poles are provided, the control circuit monitors all the touch poles and is adapted to reactivate the ignition circuit only upon establishing electrical communication between said exposed electrically conductive element and all the touch poles.

6. A security or antitheft mechanism or device in accordance with claim 5, wherein the control mechanism is adapted to reactivate the ignition circuit only upon establishing electrical communication between said exposed electrically conductive element and each of the touch poles in a preset sequence or order.

7. A security or antitheft mechanism or device in accordance with claim 1, wherein
the exposed electrically conductive element is insulated from ground;
means are provided for connecting the electrical energy supply means of the motor vehicle in electrical communication with the exposed electrically conductive element, whereby the means for connecting the electrical energy supply means to the electrically conductive element is adapted to provide a positive, low voltage potential to said electrically conductive element; and
the establishing of the electrical communication between said exposed electrically conductive element and said touch pole results in the application of a low voltage, positive, electrical potential to said touch pole which is sensed by the control circuit to reactivate the ignition circuit.

8. A security or antitheft mechanism or device in accordance with claim 7, wherein the means for connecting the electrical energy supply means in electrical communication with the exposed electrically conductive element includes a switch such that the electrical communication between the electrical energy supply means and the electrically conductive element is established only when said switch is activated and the means for connecting the electrical energy supply means with the exposed electrically conductive element provides a positive, low voltage potential to said electrically conductive element only when said switch is activated.

9. A security or antitheft mechanism or device in accordance with claim 1, wherein the control circuit comprises:
a relay switch comprising a relay coil and at least one single pole, double throw switch operable by the relay coil such that one terminal of said one single pole, double throw switch is in electrical contact with a second terminal when current flows through the relay coil and in electrical contact with a third terminal when there is substantially no current flowing through the relay coil;
a first electrical conductor means adapted to be connected between the ignition switch of said motor vehicle and one end of the relay coil of said relay switch, such that an electrical potential is provided to said first conductor wire and said relay coil when said ignition switch is in the on position;
switching means connected between the other end of said relay coil and ground, said switching means being adapted to establish electrical communication between the relay coil and ground only upon establishing electrical communication between said exposed electrically conductive element and said touch pole and to interrupt electrical communication between the relay coil and ground through said switching means when there is no electrical communication between said exposed electrically conductive element and said touch pole;
a second electrical conductor means adapted to be connected between the other end of said relay coil and said third terminal of said one single pole, double throw switch;
a third electrical conductor means adapted to be connected between ground and said one terminal of said one single throw, double pole switch;
a fourth electrical conductor means adapted to be connected between said second terminal of said one single pole, double throw switch and a point between the ignition switch and the coil on the means for electrically connecting the ignition switch, and the ignition coil;
whereby when the ignition switch is turned off current ceases to flow through the relay coil, and said one terminal of said one single pole, double throw switch makes electrical communication with the third terminal thereof so that the ignition coil is shorted through the relay switch to ground thereby inactivating the ignition system, and when the ignition is turned on and the switching means is activated by momentarily establishing electrical communication between said exposed electrically conductive element and said touch pole, momentary current flow through said switching means energizes the relay coil to maintain a steady current flow to ground through said one terminal and said third terminal of said one single pole, double throw switch, with the second terminal of said one single pole, double throw switch being disconnected from said one terminal so that the ignition coil is no longer shorted to ground, whereby the ignition system is reactivated.

10. A security or antitheft mechanism or device in accordance with claim 9, wherein
the exposed electrically conductive element is insulated from ground;
means are provided for connecting the electrical energy supply means of the motor vehicle in electrical communication with the exposed electrically conductive element, whereby the means for connecting the electrical energy supply means to the electrically conductive element is adapted to provide a positive, low voltage potential to said electrically conductive element; and
the switching means comprises a p-n-p transistor and a n-p-n transistor connected between the other end of said relay coil and ground whereby the other end of said relay coil is in electrical communication with the emitter of said p-n-p transistor, the collector of said p-n-p transistor is in electrical communication with ground, the base of said p-n-p transistor is in electrical communication with the collector of said n-p-n transistor, the emitter of said n-p-n transistor is in electrical communication with ground, and the base of said n-p-n transistor is in electrical communication with said touch pole.

11. A security or antitheft mechanism or device in accordance with claim 9 and adapted for use with a motor vehicle further having a horn, a starter switch and a starter motor system, wherein
the relay switch comprises a second single pole, double throw switch operable by the relay coil such that one terminal of said second single pole, double throw switch is in electrical communication with a second terminal when current flows through the relay coil and in electrical communication with a third terminal when there is substantially no current flowing through the relay coil;
a fifth electrical conductor means is provided which connects the starter switch in electrical communication with said one terminal of said second single pole, double throw switch;
a sixth electrical conductor means is provided which connects the second terminal of said second single pole, double throw switch in electrical communication with the starter motor system; and
a seventh electrical conductor means is provided which connects the third terminal of said second single pole, double throw switch in electrical communication with the horn of the motor vehicle,
whereby if the starter switch is turned on while no current is flowing through the relay coil of said control circuit, the motor vehicle horn is sounded and the starter motor system remains inactivated.

12. A method of preventing theft or unauthorized use of a motor vehicle and the like comprising:
providing an exposed electrically conductive element;
providing at least one touch pole which is electrically conductive and is exposed for touching but is otherwise insulated from ground;
providing a control mechanism which activates or turns the ignition system of the motor vehicle on only when electrical communication is established between the electrically conductive element and the touch pole;
touching said exposed electrically conductive element with an electrically conductive lead; and
while still touching said exposed electrically conductive element also touch said touch pole with said electrically conductive lead, whereby electrical connection is established through the electrically conductive lead between said exposed electrically conductive element and said touch pole so that the control mechanism activates the ignition of the motor vehicle and the motor vehicle may then be started.

13. A method in accordance with claim 12, wherein a plurality of touch poles are provided, the control mechanism is adapted to activate or turn on the ignition system only upon establishing electrical communication between said exposed electrically conductive element and all the touch poles.

14. A method in accordance with claim 13, wherein the control mechanism is adapted to activate or turn on the ignition system only upon establishing electrical communication between the exposed electrically conductive element and each of said touch poles in a preset sequence or order.

15. A method in accordance with claim 12, wherein the operator who is seeking to operate the motor vehicle acts as the electrically conductive lead by touching said electrically conductive element with one part of the operator's body while at the same time touching said touch pole with another portion of the operator's body, whereby electrical connection is established through the body of the operator between the exposed electrically conductive element and the touch pole.

16. A method in accordance with claim 15, wherein switching means are provided which upon activation supplies electrical energy in the form of a low voltage, positive potential from the battery of the motor vehicle to said exposed electrically conductive element and the control mechanism is adapted to activate or turn on the ignition system only when a source of low voltage, positive potential is applied to said touch pole by establishing electrical communication between the electrically conductive element and the touch pole, and to activate or turn on the ignition system, the operator first activates said switching means and then establishes electrical communication through the operator's body between the exposed electrically conductive element and the touch pole by touching the exposed electrically conductive element while also touching the touch pole.

17. A security system comprising:
electrical energy supply means;
an exposed electrically conductive element;
at least one touch pole which is electrically conductive, is insulated from ground and is exposed for touching;
a control circuit which is adapted to monitor the touch pole to sense establishment of electrical communication between electrically conductive element and said touch pole, said control circuit also being adapted to permit further use of the apparatus with which the security system is associated upon establishing of electrical communication between said exposed electrically conductive element and said touch pole,
whereby further use of the apparatus is permitted only upon touching said electrically conductive element with an electrically conductive lead, and while still touching said exposed electrically conductive element also touching said touch pole with said electrically conductive lead such that electrical connection is established between said exposed electrically conductive element and said touch pole.

18. A security system in accordance with claim 17, wherein a plurality of touch poles are provided, the control mechanism monitors all the touch poles and is adapted to permit further use of the apparatus with which the security system is associated only upon establishing of electrical communication between said exposed electrically conductive element and each of said touch poles, such that to achieve further use of said apparatus, the operator, while still touching said exposed electrically conductive element, must touch each of the plurality of touch poles.

19. A security system in accordance with claim 18, wherein the control mechanism is adapted to permit further use of said apparatus only when electrical communication is established between said exposed electrically conductive element and each of said touch poles in a preset sequence or order, such that to achieve further use of said apparatus, the operator, while still touching said exposed electrically conductive element, must touch each of the plurality of touch poles in the correct, preset sequence or order.

20. A security system in accordance with claim 17, wherein means are provided for connecting said electrical energy supply means in electrical communication with said exposed electrically conductive element to provide a low voltage, positive potential to said electrically conductive element, and the control circuit is adapted to sense establishment of electrical communication between said electrically conductive element and said touch pole by sensing the presence of a low voltage potential at said touch pole when the touch pole is in electrical communication with said electrically conductive element.

* * * * *